United States Patent [19]

Hilterhaus et al.

[11] 4,171,390
[45] Oct. 16, 1979

[54] PROCESS FOR PREPARING FILTER MATERIAL

[75] Inventors: Karl Hilterhaus, Georgsmarienhütte, Oesede; Franz G. Reuter, Lemförde, both of Fed. Rep. of Germany; Reuter Technologie GmbH, 13, Lemförde, both of Fed. Rep. of Germany

[73] Assignee: Chemie-Anlagenbau Bischofsheim GmbH, Reuter Technologie GmbH Lemförde, both of Germany Osnabrück

[21] Appl. No.: 907,017

[22] Filed: May 17, 1978

Related U.S. Application Data

[63] Continuation of Ser. No. 641,174, Dec. 16, 1975, abandoned.

[30] Foreign Application Priority Data

Dec. 21, 1974 [DE] Fed. Rep. of Germany ....... 2460835

[51] Int. Cl.² ............................................. B05D 5/00
[52] U.S. Cl. .................................... 427/244; 427/246; 427/355; 427/371; 521/64; 521/159; 521/163
[58] Field of Search ............... 427/244, 246, 355, 371; 156/77; 428/425, 904, 304, 305, 306, 308; 521/64, 159, 163

[56] References Cited

U.S. PATENT DOCUMENTS 3,284,274 11/1966 Hulslander et al. ............... 156/77 X
3,595,732 7/1971 Tingerthal ....................... 428/425 X Primary Examiner—Evan K. Lawrence
Attorney, Agent, or Firm—Larson, Taylor and Hinds

[57] ABSTRACT

A process of producing a porous polyurethane resin filter material. A first solution containing an NCO-adduct dissolved in a highly polar organic solvent is admixed into a second solution containing a highly polar organic solvent and at least one hydrazine hydrate, carbodihydrazide, piperazine and 1,4-diaminopiperazine. The first solution is admixed into the second solution over an extended period of time during which time the viscosity of the admixture is monitored and during which time the NCO pre-adduct and the hydrazine (or the like) react to form a polyurethane reaction product. During this time, the viscosity of the admixture increases. Admixture is continued with monitoring of the viscosity of the admixture until a point is reached at which the addition of even the minutest amount of the first solution into the admixture would result in instantaneous gelling thereof. At this point, the solids content of the final admixture is between 15 and 35% by weight.

The final admixture, which is castable for at least 24 hours, is coated on a textile reinforcing material and the coated material is introduced into a coagulating bath of water with no additives to form a polyurethane sheet structure which is dried to form the porous polyurethane resin filter material in accordance with the invention.

6 Claims, 2 Drawing Figures

A ≠ B

A ≠ B

A = B

PROCESS FOR PREPARING FILTER MATERIAL

This is a continuation, of application Ser. No. 641,174 filed Dec. 16, 1975 now abandoned.

BACKGROUND OF THE INVENTION

Laminated and sheet filters have been known for a long time. These materials substantially consist of woven, knitted or needled fibers of different length which additionally have been reinforced with an adhesive or by mechanical means. As fiber material all sorts of materials come into practical consideration, either of natural or synthetic origin. However, these filters have the property in common—as they all have a more or less porous surface—of being undesirably clogged by the particles to be filtered out. Moreover, this effects an initially rapid throughput of filtrate which is perhaps not yet sufficiently thoroughly filtered, and a growingly insufficient throughput with increasingly clogged filter area.

Furthermore, the production of sheet structures by coagulation of a polymer solution has long been known. Moreover, it has been known to produce microporous sheet structures, e.g. from polyurethane solutions, according to the coagulation technique.

Therefore, it is an object of the invention to design the microporous and/or macroporous sheet structures obtained by coagulation such that, on the one hand, they may be used as membrane-type filters and, on the other hand, as genuine filters, e.g. as liquid filters.

It has been a further object of the invention to provide a process by means of which polyurethane solutions can be prepared in a very simple and reproducible way which, by means of the coagulation technique, give microporous and/or macroporous sheet structures of largely crosslinked polyurethane elastomers and which, after suitable after-treatment, constitute the filter materials of the invention.

Further objects of the present invention will become apparent from the following description.

SUMMARY OF THE INVENTION

The foregoing and other objects which will be apparent to those of ordinary skill in the art are achieved in accordance with the present invention in a process which includes the following steps:

(a) in a manner known per se an NCO pre-adduct is prepared, and said pre-adduct is dissolved in a suitable solvent, or the NCO pre-adduct is directly prepared in a solvent, then (b) to a previously prepared solution of a suitable solvent and at least one member selected from the group consisting of hydrazine hydrate, carbodihydrazide, piperazine, and 1,4-diaminopiperazine, the NCO pre-adduct solution is admixed over an extended period of time during which the NCO pre-adduct and the member of the second solution react to form a highly viscous reaction product, and the admixing of the pre-adduct solution into the second solution is continued and the viscosity monitored and measured under reaction conditions until the viscosity of the admixture is such that the addition of even the minutest amount of the pre-adduct solution would have resulted in instantaneous gelling of the admixture, and at which point the addition of the pre-adduct solution is stopped immediately, the final admixture thus produced having a solids content of between 15 and 35% by weight and remaining castable for at least 24 hours.

(c) with the resulting high viscosity final solution one or both sides of the textile reinforcing material are coated, optionally on a subsequently removable supporting belt, (d) the coated textile reinforcing material is introduced into a coagulating bath, and (e) the resulting sheet structure is dried.

Depending on the coagulation technique employed, one obtains sheet structures with symmetrical or asymmetrical pore configuration in the central stratum enclosed by extremely thin poreless outer skin layers. When the polymer solution applied by doctor blade on a smooth continuous substrate is coagulated, this results in the formation of an asymmetrical pore configuration, i.e. pores will form which are shaped like funnels. On the other hand, when the polymer solution applied by doctor blade onto a reinforcing grid such that the reinforcement is substantially embedded therein is subjected to coagulation in freely supporting relationship, the liquid of the coagulating bath can attack the sheet structure to be coagulated from both sides so that a symmetrical pore configuration is obtained, i.e. numerous tubular pores are formed that are aligned perpendicularly to the surface. The symmetrical and the asymmetical pore configurations are illustrated by the attached drawing in which.

BRIEF DESCRIPTION OF THE DRAWINGS

In FIG. 1 the skin layer A denotes the layer which has been exposed to the influence of the coagulating liquid. The external layer B constitutes the side that was in direct contact with the smooth substrate so that from this side the coagulation liquid could not affect the layer to be coagulated.

In FIG. 2 the skin layers A are substantially identical since both were equally exposed to the influence of the coagulating liquid. the circles C denote the reinforcing fabric.

DESCRIPTION OF THE PREFERRED EMBODIMENTS

Figure 1:
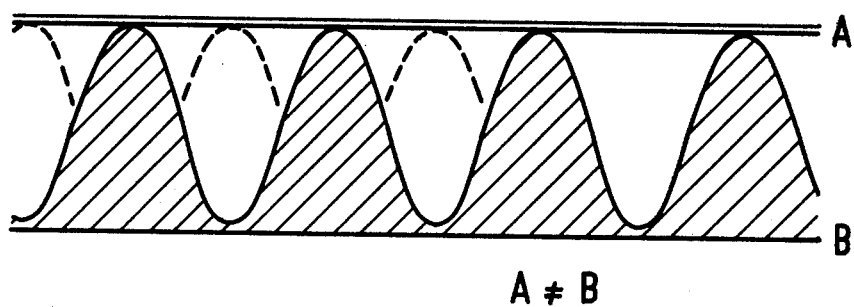
FIG. 1 shows schematically an enlarged cross section through a microporous sheet with asymmetrical pore configuration and FIG. 2 shows schematically an enlarged cross section through a microporous sheet with symmetrical pore configuration.
Figure 2:
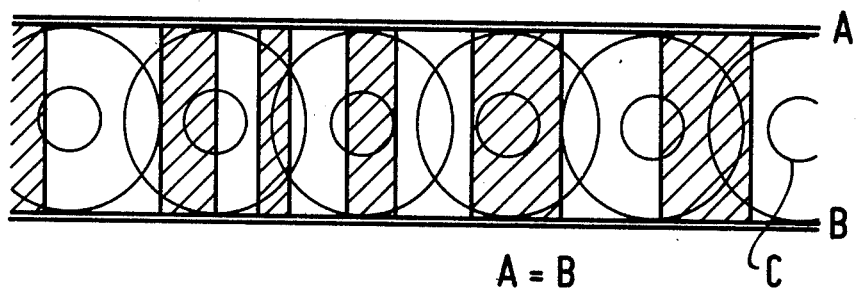

Depending on the use of the filter material, one or both sides may be abraded. The question how much is to be abraded off the surface of the sheet structures in the individual case depends on the filter efficiency desired with the respective filter material. Hence, abrasion can already influence the pore size of the filter material. Abrasion is effected in a manner known per se, preferably according to the wet grinding technique. Otherwise the pore size is controlled in a manner known per se, e.g. by the type of coagulation bath or the applied coagulation technique and by the addition of specific pore-regulating substances, e.g. organic acid, such as formic acid.

Hereafter the preferred process of the invention for the production of the polyurethane filter materials will be described by means of which it is possible without high investment of equipment to prepare crosslinked polyurethane elastomers which have such a high degree of crosslinkage that after their preparation they are no longer completely soluble in the previously used solvent.

The NCO pre-adducts used according to the invention are higher molecular weight compounds with two terminal NCO groups, which preferably possess a molecular weight of 100 to 10,000, especially between 800 and 2,500. Preferably the NCO pre-adducts have a content of NCO groups of 1.5 to 5%. The preparation of these NCO pre-adducts is carried out in a known manner by reacting higher molecular weight compounds containing OH groups with an excess of polyisocyanate. The preparation of such NCO pre-adducts is described, for example, in Angewandte Chemie 63, 523 to 531 (1952); Kunststoffe 42, 303 to 310 (1952); German Pat. No. 831,772; German Pat. No. 897,014; German Pat. No. 929 507; and U.S. Pat. No. 3,000,757. Preferably the formation of the NCO pre-adduct is controlled such that linear NCO pre-adducts having a narrow molecular weight distribution are obtained. The question of which NCO pre-adducts to use in the individual case depends on the indivdual systems, because the reactivity of the NCO pre-adduct relative to the chain propagation and/or crosslinking agent largely determines the relationship between linear molecular weight and the degree of crosslinkage.

Higher molecular weight compounds containing OH groups which are suitable for the production of the NCO pre-adducts are, for example, polyesters, polyethers, polyesteramides, polythioethers and polyacetals.

As polyols for the preparation of the NCO pre-adducts one may use, for example, linear hydroxypolyesters which contain primary and/or secondary and/or tertiary hydroxyl groups and which have been obtained either by polycondensation of $\epsilon$-caprolactone or 6-hydroxycaproic acid or by copolymerisation of $\epsilon$-caprolactone which dihydric alcohols or by polycondensation of dicarboxylic acids with dihydric alcohols.

The hydroxylpolyesters used for the production of the NCO pre-adducts can also be produced for dicarboxylic acids or mixtures of dicarboxylic acids and dihydric alcohols. Suitable dicarboxylic acids include, for example, adipic acid, succinic acid, suberic acid, sebacic acid, oxalic acid, methyladipic acid, glutaric acid, pimelic acid, azelaic acid, phthalic acid, terephthalic acid, isophthalic acid, maleic acid, fumaric acid, citraconic acid, itaconic acid. Suitable dihydric alcohols or mixtures thereof which are reacted with the dicarboxylic acids or $\epsilon$-caprolactone to form the desired hydroxypolyesters include, for example, ethylene glycol, propylene glycol, butylene glycols, for example 1,4-butanediol; butenediol, butindiol, bis-(hydroxymethylcyclohexane), diethylene glycol, 2,2-dimethylpropylene glycol, 1,3-propylene glycol. However, the above mentioned diols may also be used all by themselves. This also applies to diamines or other low molecular weight compounds containing two hydrogen atoms with Zerewitinov activity.

Suitable polyalkylene ethers possessing primary and/or secondary and/or tertiary hydroxyl groups which can be used according to the invention are obtained by reacting an alkylene oxide with a small quantity of a compound containing active hydrogen, such as water, ethylene glycol, propylene glycol, amylene glycol. It is also possible to use alkylene oxide condensates of ethylene oxide, propylene oxide, butylene oxide, amylene oxide, styrene oxide and mixtures thereof. It is also possible to use the polyalkylene ethers which can be produced from tetrahydrofuran.

According to the invention every suitable polyester amide can be used for the preparation of the NCO pre-adducts, for example the reaction product of an amine and/or aminoalcohol with a dicarboxylic acid. Suitable amines are, for example, ethylenediamine, propylenediamine; suitable amino-alcohols are, for example, 1-hydroxy-2-amino-ethylene. Any suitable polycarboxylic acid can be used, for example those which have already been mentioned for the production of the hydroxypolyesters. Furthermore it is possible to use a mixture of a glycol and of an aminoalcohol or polyamine. Each of the glycols already mentioned for the production of the hydroxypolyesters can also be used for the production of the hydroxypolyester amides.

According to the invention it is also possible to use for the preparation of the NCO pre-adducts those polyols which can be referred to as polyetherester polyols, in which there occur alternating ester bonds and ether bonds. These polyetherester polyols are described in Canadian Pat. Specification No. 783,646.

Polyols preferably used for the preparation of the NCO preadducts include polyesters on the basis of adipic acid, 1,6-hexanediol and neopentyl glycol with an average molecular weight of approximately 2,000 (Polyol 2,002 manufactured by Polyol Chemie of Osnabruck, hydroxyl number 56, acid number 1), polyesters on a polycaprolactone basis with an average molecular weight of 2,000 (Niax Polyol D 560 manufactured by Union Carbide Corporation) and polyethers with the trade name "Polyol PTMG" of BASF with an average molecular weight of 2,000.

Furthermore, higher molecular weight compounds with terminal carboxyl, amino and mercapto groups are suitable. Polysiloxanes which have groups which are reactive with isocyanates should also be mentioned. Further utilisable compounds are described, for example, in J. H. Saunders, K. C. Frisch "Polyurethanes" Part 1, New York, 1962, pages 33 to 61 and in the literature cited here.

For the preparation of the NCO pre-adducts it is possible to use any suitable organic diisocyanate, for example aliphatic diisocyanates, aromatic diisocyanates, alicyclic diisocyanates and heterocyclic diisocyanates, for example methylene diisocyanate, ethylene diisocyanate, propylene diisocyanate, butylene diisocyanate, cyclohexylene 1,4-diisocyanate, cyclohexylene 1,2-diisocyanate, tetra- or hexamethylene diisocyanate, arylene diisocyanates or their alkylation products, such as phenylene diisocyanates, naphthylene diisocyanates, diphenylmethane diisocyanates, toluylene diisocyanates, di- or triisopropylbenzene diisocyanates; aralkyl diisocyanates such as xylylene diisocyanates, fluoro-substituted isocyanates, ethyleneglycol diphenylether-2,2'-diisocyanate, naphthalene-1,4-diisocyanate, naphthalene-1,1'-diisocyanate, biphenyl-2,4'-diisocyanate, biphenyl-4,4'-diisocyanate, benzophenone-3,3-diisocyanate, fluorene-2,7-diisocyanate, anthraquinone-2,6-diisocyanate, pyrene-3,8-diisocyanate, chrysene-2,8-diisocyanate, 3'-methoxyhexane diisocyanate, octane diisocyanate, $\omega,\omega'$-diisocyanate-1,4-diethylbenzene, $\omega,\omega'$-diisocyanate-1,4-dimethylnaphthalene, cyclohexane-1,3-diisocyanate, 1-isopropybenzene-2,4-diisocyanate, 1-chlorobenzene-2,4-diisocyanate, 1-fluorobenzene-2,4-diisocyanate, 1-nitrobenzene-2,4-diisocyanate, 1-chloro-4-methoxybenzene-2,5-diisocyanate, benzene-azonaphthalene-4,4'-diisocyanate, diphenylether-2,4-diisocyanate, diphenylether-4,4-diisocyanate, as well as oliisocyanates containing isocyanurate groups.

Diisocyanates which are preferably used according to the invention are: 4,4'-diphenylmethane diisocyanate and/or its 2,4- and/or its 2,2'-isomers, 1,6-hexamethylene diisocyanate, 2,4-toluylene and/or 2,5-toluylene diisocyanate and m-xylylene diisocyanate.

The chain propagating/crosslinking agents are preferably substances containing highly active hydrogen atoms of different activity, as present, for instance, in the NH$_2$ group of hydrazines. The use of hydrazine compounds, especially of hydrazine itself, is therefore preferred. Preferably the chain propagation takes place such that about 60% of said NH$_2$ groups are used for chain extension and the remaining 40% for chain crosslinkage. The reaction must take place spontaneously so that addition of pre-adduct and rise in viscosity occur in proportion. Systems with chain propagating/crosslinking mixtures of lesser activity (than hydrazine, for instance) must be catalyzed such that the 60 to 40% relation is maintained, to thereby utilize in an especially favorable way the principles of the Flory equation which determines the degree of polymerization in a solvent with the number of crosslinkage sites.

In this connection it is pointed out that according to Saunders and Frisch in "Polyurethanes: Chemistry and Technology," II. Technology, page 319, the preparation of polyurethane elastomers is especially difficult if diamines are used as chain propagating agents, since they easily lead to non-homogeneous products on account of their high reactivity. However, the invention makes use of this very circumstance in order to obtain uniform products. Thus, the high reactivity of hydrazine is deliberately utilized to achieve chain propagation and a self-controlling degree of crosslinkage such that this takes place in solution and the final solution remains castable for at least 24 hours when properly stored.

In order to achieve additional crosslinkage, the crosslinking reactions familiar in the polyurethane chemistry may be utilized. Moreover, formaldehyde in polymeric form may be added to the crosslinking agent solution. When formaldehyde in dimethylformamide and hydrazine hydrate are introduced first into the reactor, the first step of a Wolff-Kishner reaction is initiated in which the hydrazone is formed besides water. However, under the selected reaction conditions this reaction is largely suppressed and the following crosslinking reaction is promoted:

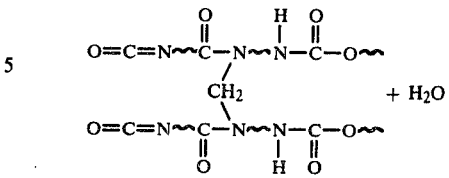

The amount of added aldehyde depends on the later use of the product. The upper limit is the stoichiometrical point, based on NH groups of the elastomer. However, this crosslinkage is different, since it takes place later at elevated temperatures such as those occuring during the removal of the solvent.

Additional crosslinkage is also achieved when unsaturated systems are employed, and these double bonds are broken up by electron bombardment thereby initiating localized branching reactions.

As mentioned before, suitable substances for the purposes of the invention are particularly hydrazine compounds such as hydrazine hydrate, carbohydrazide, carbodihydrazide, semicarbazide, carbazone, oxalic acid dihydrazide, terephthalic acid dihydrazide and dihydrazides of longer chain dicarboxylic acids and also dihydrazine compounds of the general formula $$H_2N-NH-X-NH-NH_2,$$

in which X signifies CO, CS, P(O)OR, P(O)NR$_2$, BOR or SiO$_2$, in which R stands for an aliphatic or aromatic radical, as well as compounds which have the piperazine structure

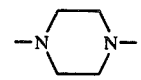

and two or more terminal amino groups.

Preferably the radicals R represent alkyl or aryl radicals. Of course, in the process according to the invention one can also use the corresponding hydrate forms, which is even preferred in the case of hydrazine in view of the lesser handling hazard.

By the polyaddition of the above-described NCO prepolymers with hydrazine or dihydrazine compounds one obtains, for example, polycarbohydrazides or polycarbodihydrazides or mixtures thereof with recurring units partially crosslinked via the "—NH—" and "—NH—NH—" groups.

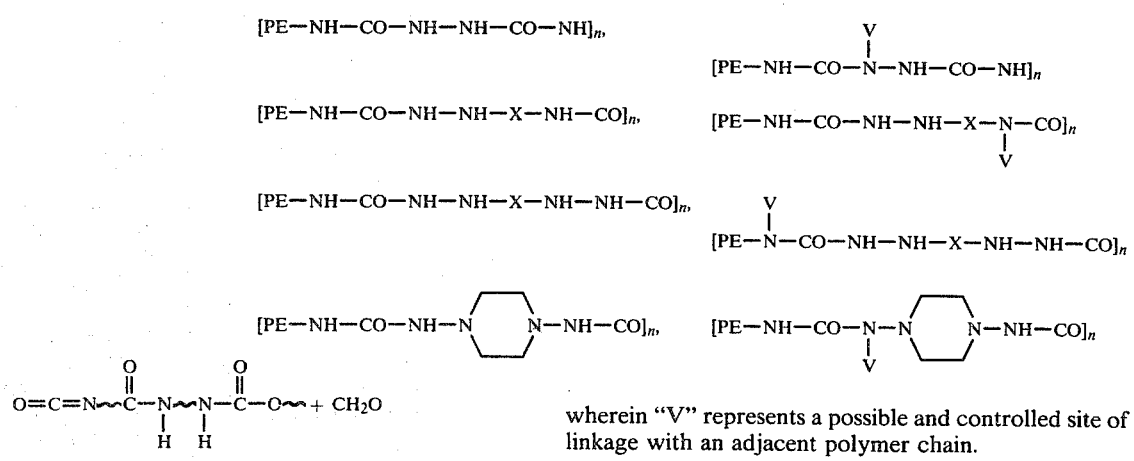

wherein "V" represents a possible and controlled site of linkage with an adjacent polymer chain.

In these formulae the abbreviation PE signifies polyester, polyether, polyamides, polythioether, polyacetals; X signifies a carbonyl, thiocarbonyl, sulpho, $SiO_2$, BOR, P(O)OR or P(O)NH$_2$ group; R stands for an aliphatic or aromatic radical; and n signifies that the final polyurethane contains plurality or multiplicity of the units mentioned before.

Suitable diamines which can be used according to the present invention include, for example, ethylenediamine, propylenediamine, toluylenediamine, xylylenediamine, piperazine or piperazine hexahydrate as well as 1,4-diaminopiperazine.

As already mentioned, according to the invention one uses the hydrazines, dihydrazine compounds and/or diamines preferably either in a deficient quantity or in excess. When one uses a deficient quantity one adds to the prepared component solution further substances which contain at least two groups possessing active hydrogen atoms which react, optionally differently, with isocyanates, and which can act either as chain propagating and/or crosslinking agents, these substances occuring in excess after the stoichiometrical reaction has taken place.

In both cases the excess can amount up to 30%. Suitable compounds of this type include all the other chain propagating agents or crosslinking agents generally employed in polyurethane chemistry, for example diols, e.g. ethyleneglycol, propyleneglycol, butyleneglycols, 1,4-butanediol, butenediol, butindiol, xylyleneglycols, amyleneglycol, 1,4-phenylene-bis-$\beta$-hydroxyethyl ether, 1,3-phenylene-bis-$\beta$-hydroxyethyl ether, bis-(hydroxymethylcyclohexane), hexanediol, and alkanolamines, for example ethanolamine, aminopropyl alcohol, 2,2-dimethylpropanolamine, 3-amino-cyclohexyl alcohol, $p$-aminobenzyl alcohol, trimethylolpropane, glycerol or N,N,N',N'-tetrakis-(2-hydroxypropyl)ethylenediamine. Of all these substances one preferably uses glycerol. Of course, several chain lengthening and/or crosslinking agents can be used at the same time. The presence of water, which may also act as chain propagating and/or crosslinking agent, does not adversely affect this process.

If desired, it is possible to add to the above-described solution containing hydrazines, dihydrazine compounds and/or diamines chain terminating agents and optionally additional gelling agents either besides or instead of the added chainlengthening and/or crosslinking agents. Suitable chain terminating agents include, for example, monohydric alcohols, for example methyl alcohol, ethyl alcohol, propyl alcohol or butyl alcohol, or substances with an amino group such as ethylamine.

The above described solutions containing hydrazines, dihydrazine compounds and/or diamines can have added to them prior to their reaction with the NCO pre-adducts fillers, organic or inorganic pigments, dyestuffs, optical brighteners, ultra violet absorbers, antioxidants and/or additional crosslinking substances, especially substances which effect crosslinkage only after coagulation at elevated temperatures. Sometimes, however, it is more advantageous to add the above mentioned additives to the final polyurethane solution, optionally just before its use for the production of the desired products, rather than to the solution containing the hydrazines, dihydrazine compounds and/or diamines.

Advantageously the dyestuffs, which should be soluble in the solvent used, are added shortly prior to shaping, because a few types of dyestuff can exert an undesirable catalytic action on the NCO pre-adduct. A disadvantage of these dyestuffs is that many of them bleach as a result of the action of light. It is therefore more favorable in certain cases to use the abovementioned pigments. It is true that generally speaking these do not give such bright tones as do the soluble dyestuffs, but they are characterized by good covering power.

It has been additionally found that, contrary to expectations, pigmentation enhances the microporous structure of the sheet material. This has a favorable effect on the permeability.

If the pigments are properly chosen, the quantity used can be kept small. There is therefore no fear of the elastic properties of the system being adversely affected afterwards to any appreciable extent.

In the case of carbon black pigments it is even possible, if suitable products are chosen which possess a certain number of OH groups, to incorporate these firmly in the pre-adduct. It should also be pointed out that carbon black pigments are the best stabilizers against hydrolysis or such polyurethane systems.

The above mentioned flotation of other pigments can be avoided by the addition of so-called anti-floating agents.

Pure fillers are available in large number. Generally speaking it can be said that all non-reactive powdered or fibrous materials whose individual fibre length is below the thickness of the film can be embedded completely. In this way one can ensure that thinner coatings than usual will give more uniform surfaces on a substrate material.

Of particular interest is the admixture of microporous silicas by means of which the permeability of the material can be precisely controlled. Moreover, these porous substances, being primary porous centers in the not yet coagulated film, offer valuable assistance for the later exchange of non-solvent.

They have both a supporting function for the incoming nonsolvent and act as receiving station for the displaced solvent. This effects more rapid coagulation and more uniform microporosity.

However, it is also possible to operate with reactive additives. If one chooses, for example, a substance containing OH groups, e.g. cellulose powder or fibres, it is possible to some extent to incorporate these firmly as fillers. These substances are particularly suited to improve the initial tear strength. Also the nature of the surface of the microporous sheet structure can be varied depending on the fibre length.

Moreover, it is possible, if desired, to incorporate flavoring substances, e.g. coffee extract.

Suitable solvents for the reaction components include, according to the invention, preferably organic solvents, especially highly polar solvents. Examples for such solvents are aromatic hydrocarbons such as benzene, toluene, xylene, tetraline, decaline; chlorinated hydrocarbons such as methylene chloride, chloroform, trichloroethylene, tetrachloroethane, dichloropropane, chlorobenzene; esters such as ethyl acetate, propyl acetate, butyl acetate, diethyl carbonate; ketones such as acetone, butanone-2, pentanone-2, cyclohexanone; ethers such as furan, tetrahydrofuran, dioxan, anisol, phenetol, dialkoxyethanes and ether-esters of glycol; acid amides such as formamide, dimethylformamide, dimethylacetamide; and sulfoxides such as dimethylsulfoxide. The especially preferably employed solvents include the acid amides, e.g. formamide, dimethylformamide and N,N-dimethylacetamide; sulfoxides, e.g. dimethylformamide and N,N-dimethylacetamide, sulfoxides, e.g. dimethylsulfoxide, dioxane, tetrahydrofuran or mixtures thereof. Although the NCO pre-adducts may be dissolved in a solvent other than hydrazines, dihydrazine coumpounds and/or diamines, the same solvent or solvent mixture is preferably used in the process of the invention for both reaction components.

For the chain propagation and crosslinkage reactions proper both of which take place substantially simultaneously the NCO pre-adduct solution is added to the previously introduced chain propagating/crosslinking agent solution with continuous stirring. The polyurethane formation reaction takes place exothermically and is rapidly terminated. Both the chain propagation and the crosslinkage effect the rise in viscosity. The viscosity abruptly increases rapidly, after an initial slight increase. During this stage of the process the NCO pre-adduct solution must be carefully added to the other component, because after the addition of a certain amount even minutest additions of further NCO pre-adduct effect a high increase in viscosity so that a certain point of the process the reaction solution suddenly gels. According to the invention, it has been surprisingly found that excellently suitable polyurethane solutions are obtained when the addition of NCO pre-adduct is discontinued when the viscosity of the solution has reached such a level. This viscosity level lies between 6000 and 40,000 cps. in the normally employed systems, i.e. when the reaction solution or the final solution has a honey-like consistency.

In the practical operation of a preferred embodiment of the process of the invention it has further been found that the NCO pre-adduct solution, which preferably has a solids content of 60 to 80% by weight, especially of 70% by weight, and a content of free isocyanate groups of from 1.5 to 5%, is continuously added with stirring to the other component solution containing the hydrazines, dihydrazine compounds and/or diamines at a concentration of 0.02 to 0.05 mole percent, at a rate such that in the instant where rapid increase in viscosity takes place the reaction solution has a solids content between 15 and 35% by weight. As the quantity of the NCO pre-adduct added depends on many factors (temperature, molecular weight of the polyester or polyether used for the production of the pre-adduct, solids content of NCO groups, age of the pre-adduct), it is not possible to calculate this exactly; it is therefore necessary to operate empirically. The safest way is to proceed by determining in a small preliminary test the quantity of pre-adduct approximately required and then, in the actual preparation of the final polyurethane solution, to rely upon the increase in viscosity. In order to produce larger quantities of a useful final solution or reaction solution, it is advisable to use a flow-through gauge which can reproduce the figure found during the preliminary test. However, according to the invention the precision adjustment is then made by means of a built-in viscosimeter. The simplest apparatus recommended for measuring the viscosity is a falling ball viscosimeter, because the accuracy is sufficient and cleaning is easy, although this instrument can only be used for unpigmented systems. If one wishes to stain the product, this must be done after the viscosity has been adjusted. Another possibility to determine the viscosity is the measurement of the power output of the stirrer motor by means of a suitable ammeter.

According to a special embodiment of the invention, one preferably uses as NCO pre-adduct one which has been obtained by reacting a polyester (produced from adipic acid and hexanediol-1,6) with 4,4'-diphenylmethane diisocyanate in dimethylformamide. This NCO pre-adduct solution is added to a solution of a deficient quantity of hydrazine hydrate in dimethylformamide, to which one has added an excess of glycerol. During the addition and the reaction one maintains the reaction temperature between 20° and 45° C., preferably between 25° and 40° C.

Generally one controls the preparation of the final polyurethane solution in such a way that prior to shaping all the polyurethanes are dissolved in the reaction solution, but after shaping a polymer structure is obtained which is no longer soluble to the extent of more than 50% by weight in cold dimethylformamide and is no longer soluble to the extent of more than 60 percent by weight in boiling dimethylformamide.

The solution thus obtained is highly viscous, uniformly pregelled may be stored for days. When the indicated reaction conditions (temperature, solids content, time and the proper sequence of the individual reaction steps) are observed, a final solution is reproducibly obtained which is within the borderline state between solution and gel and which surprisingly results in the subsequently described elastomeric products. By the selection of suitable raw materials the physical properties can be tailored to a specific end use. The optical properties may be determined during the formation of the polymer structure without any additional processing. Suitable other gelling agents include, for instance, solvents miscible with the solvent or the solvent mixture of the final reaction solution but constituting a non-solvent for the resulting crosslinked polyurethanes. Such non-solvents include aromatic hydrocarbons such as benzene, toluene, ethylene benzene, xylene, tetraline, decaline; industrial solvent mixtures containing aromatic hydrocarbons such as Sangajol; aliphatic hydrocarbons such as hexane, heptane, octane, nonane, decane and their stereoisomers; petroleum fractions such as petroleum ether, ligroin, white spirits, turpentine substitute, mineral spirits; cycloaliphatic hydrocarbons such as methyl cyclohexane, oil of turpentine; chlorinated hydrocarbons such as chloroform, dichloroethylene, trichloroethylene, hexachloroethane, perchloroethylene, chlorocyclohexane, methylchlorocyclohexane; esters such as methyl acetate, ethyl acetate, propyl acetate, butyl acetate, formic acid esters; ketones such as acetone, butanone-2, pentanone-2; ethers such as diethyl, dipropyl, dibutyl ether; nitrocompounds such as nitromethane, nitrobenzene; alcohols such as tert.-butanol; and nitriles such as acetonitrile.

It goes without saying that, according to the systems used, the compounds listed here as non-solvents can also act as solvents, so that it is not possible to avoid some overlapping in the list given above.

The final polyurethane solution prepared according to the invention is then used for the production of the filter materials of the invention in that the high viscosity solution is applied onto one or both sides of the textile reinforcing material and then the resulting structure is introduced into a coagulating bath. On principle, the above mentioned non-solvents or mixtures of solvents and non-solvents may be employed as coagulating fluid. For economical reasons, however, it is proposed according to the invention to use preferably water without any additives as coagulating liquid. In contrast to the conventional coagulating processes the coagulation in the systems of the invention proceeds ten times faster.

Of course, the structures obtained after coagulation may later be treated with respective agents, unless corresponding additives had previously been contained in the polyurethane solution prior to coagulation.

By means of the process of the invention it is possible to produce microporous sheet structures having good mechanical properties, excellent flexibility, and outstanding solvent resistance which exhibit excellent filtering efficiency. In general, the microporous structures may be produced in any desired configuration, e.g. in the form of hoses.

Besides the use of the novel materials as filters for industrial and household purposes, they may also be employed as technical sheets in all instances where
1. air is to be purified and/or sterilized;
2. gases are to be removed from high viscosity solutions;
3. partially permeable packaging material is required; and
4. emulsions are to be broken.

The following examples explain the invention without constituting a limitation thereof. In the examples DMF stands for "dimethylformamide" and MDI denotes "4,4'-dimethylmethane diisocyanate".

EXAMPLE 1

Conditioning of the Polyol (Step 1)

In a stirred reactor equipped with vacuum connection and heating and cooling jacket somewhat more than the calculated amount of polyol is introduced and degassed and dehydrated at 100° C./10 Torr for 30 minutes. Thereafter it is cooled to 50° C. and 0.1% acetyl chloride is added. The mixture is stirred for 30 minutes at that temperature, then heated to 100° C., and a vacuum is applied until no further gas evolves. A sample is taken and the OH and acid numbers are determined in the familiar way. The thus prepared polyol is adjusted with DMF to 70% by weight of solids.

Preparation of the NCO Pre-Adduct with NCO/OH=2.04 (Step 2)

In a dry nitrogen-filled stirred reactor the calculated amount of MDI is introduced and adjusted to 70% solids by means of DMF. The MDI is rapidly dissolved to form a clear solution with stirring and heating. The polyol of step 1 having a temperature of about 55° C. is added to the MDI solution of 40° C. over a period of 30 minutes. The exothermic heat must be removed at 65°±2° C.

The resulting light yellow NCO pre-adduct solution has a residual NCO content of about 3.5%, depending on the molecular weight of the polyol.

Preparation of the Solution ("Final Solution") Containing the Crosslinked Polyurethanes (Step 3)

In a vacuum-tight stirred vessel a solution of 60 parts by weight or porous silica (kieselguhr, diatomaceous earth), 300 parts by weight of DMF, 10 parts by weight of glycerol, 2 parts by weight of hydrazine hydrate is introduced and heated to 30°±2° C. The NCO pre-adduct having a temperature of about 40° C. is continuously added with stirring such that the viscosity of the final solution rises at first slowly and then with growing rapidity. Ultimately small additions effect an extremely high rise in viscosity. This happens at about 10,000 centipoises. Thereafter the solution is degassed.

Shaping (Step 4)

The solution ("final solution") obtained according to step 3 and containing the crosslinked polyurethanes is applied onto the textile supporting material from both sides and the assembly is immersed into a hot water bath of 85° C. After about 1.5 minute a white elastic filter sheet is obtained which is no longer completely soluble in the previously used solvent.

EXAMPLE 2

Into a dry stirred reactor 2.04 mols MDI in 70% solution in DMF are introduced at 40° C. under a nitrogen atmosphere.

For half an hour one mole of a stabilized polyester in 70% DMF solution and consisting of adipic acid and hexanediol-1,6 with a hydroxy number of 139.5 is continously added at a reaction temperature of 65°±2° C. An NCO pre-adduct solution having an NCO content of 2.5 to 3.0% is obtained which is stable for weeks.

The above described NCO pre-adduct solution is continously added to 3100 parts by weight of DMF and 50 parts by weight of hydrazine hydrate in a stirred reactor equipped with a paddle mixer at 35° C. over a period of 5 minutes until minutest further additions result in an extremely high rise of the viscosity, i.e. a final polyurethane solution of honey-like consistency has been formed. The final about 30% polyurethane solution is processed into the filter material as described in example 1.

EXAMPLE 3

An NCO pre-adduct solution prepared as described in example 2 is stirred into a solution of 3100 parts by weight DMF, 200 parts by weight glycerol and 50 parts by weight hydrazine hydrate until even minutest further additions effect an extremely high increase in viscosity, i.e. until a high viscosity honey-like polyurethane solution has been formed which is processed into the filter material as described in example 1.

EXAMPLE 4

A 70% solution of 2.04 mols MDI in DMF is introduced under nitrogen at 40° C. into a dry stirred reactor.

1 Mol of a stabilized polyester in 70% DMF solution consisting of adipic acid and equal molar proportions of ethylene glycol and butanediol-1,4 having a hydroxyl number of 56 is continously added over a period of half an hour at a reaction temperature of 65°±2° C. There is formed an NCO pre-adduct solution having a residual NCO content of 1.5 to 2.0% which is stable for weeks.

To a solution consisting of 3100 parts by weight of DMF, 90 parts by weight of carbodihydrazide and 100 parts by weight of methanol so much of the prepared NCO pre-adduct solution is stirred until minutest additions result in an extreme rise of the viscosity, i.e. until a high viscosity final polyurethane solution has been formed, which is processed into the filter material as described in Example 1.

EXAMPLE 5

2.04 Mols MDI in 70% DMF solution are introduced at 40° C. into a dry stirred reactor under nitrogen.

One mol of a polyester in 70% DMF solution which consists of adipic acid and hexanediol-1,6 having a hydroxyl number of 139.5 is continously added over a period of half an hour at a reaction temperature of 65°±2° C. There results an NCO pre-adduct solution having a residual NCO content of 3.2% which is stable for weeks.

About 165 parts by weight of the above NCO pre-adduct solution are stirred into a solution of 300 parts by weight of DMF, 7.68 parts by weight of carbodihydrazide, and 10 parts by weight of glycerol until even minutest further additions cause an extreme rise in viscosity, i.e. an high viscosity final polyurethane solution has formed with slight heat effect which remains stable for many days. This final solution is processed into the filter material as described in Example 1.

EXAMPLE 6

About 183 parts by weight of an NCO pre-adduct solution ($NCO:NH_2 > 1$) prepared according to example 5 are added to a solution of 300 parts by weight of DMF, 2.5 parts by weight of piperazine, 0.8 parts by weight of hydrazine hydrate, until minutest further additions result in an extremely high rise in viscosity. The resulting final polyurethane solution is processed into the filter material as described in Example 1.

EXAMPLE 7

59.5 parts by weight of the NCO pre-adduct solution mentioned in example 5 are stirred into a solution of 100 parts by weight of DMF, 2.56 parts by weight of carbodihydrazide, until even minutest further additions produce an extreme rise in viscosity. The resulting final polyurethane solution is processed into the filter material as described in Example 1.

EXAMPLE 8

10 Percent (based on solids) of a non-reactive pigment and/or dyestuff having a particle size up to 5 microns are dispersed into a final polyurethane solution prepared as described in Example 2, and fabricated into a filter material as described in Example 1.

EXAMPLE 9

An NCO pre-adduct solution prepared as described in Example 2 or 3 is stirred into a solution of 300 parts by weight of DMF, 11.6 parts by weight of 1,4-diaminopiperazine, and 10 parts by weight of glycerol until minutest additions result in an extremely high rise in viscosity. The resulting final polyurethane solution is processed into a filter material as described in Example 1.

EXAMPLE 10

The same procedure is used as in Example 1 with the exception that in step 3 ultrafinely ground coffee powder and/or coffee extract is added in lieu of porous silica. After coagulation and the abrasion treatment a light brown sheet structure is obtained which may be repeatedly used especially favorably for the preparation of coffee.

EXAMPLE 11

The same procedure is used as in Example 1 with the exception that cellulose powder is used in lieu of silica. After coagulation there is obtained a white microporous sheet structure which provides an excellent filter material after abrasion.

EXAMPLE 12

The same procedure is followed as in Examples 10, 11 or 12 and a reinforcing fabric of natural or synthetic high polymer material or a metal wire netting is immersed into the composition. Thereafter the material is coagulated in hot water.

EXAMPLE 13

The same procedure is followed as in Examples 1 to 12, while the coagulation is carried out in a hot aqueous solution containing soluble salts and/or acids and/or bases and/or water-miscible and/or soluble organic solvents as pore regulating agents.

What we claim is:

1. A process of producing a porous polyurethane resin filter material comprising:
    (a) providing a first solution containing 60 to 80% by weight of an NCO-adduct having 1.5 to 5% free isocyanate groups dissolved in a highly polar organic solvent;
    (b) providing a second solution containing a highly polar organic solvent and at least one member selected from the group consisting of hydrazine hydrate, carbodihydrazide, piperazine and 1,4-diaminopiperazine and in which solution said member is present in an amount of from 0.02 to 0.05 mole percent;
    (c) admixing said first solution into said second solution over an extended period of time during which the NCO pre-adduct and said member of said second solution react to form a highly viscous reaction product and continuing the admixing of said first solution into said second solutions and monitoring the viscosity measured under reaction conditions until the viscosity of the admixture is such that the addition of even the minutest amount of said first solution would have resulted in instantaneous gelling of the admixture, and at which point the addition of said first solution is stopped immediately, the final admixture thus produced having a solids content of between 15 and 35% by weight and remaining castable for at least 24 hours;
    (d) coating the final admixture on a textile reinforcing material;
    (e) introducing the textile material having the coating of said final admixture into a coagulating bath of water to form a polyurethane sheet structure; and
    (f) drying said sheet structure to form said porous polyurethane resin filter material.

2. A process according to claim 1 wherein said highly polar organic solvent comprises dimethyl formamide.

3. A process according to claim 1 wherein said second solution comprises hydrazine hydrate and dimethyl formamide.

4. A process according to claim 1 wherein said second solution further comprises at least one member selected from the group consisting of crosslinking agents, chain propagating agents, chain terminating agents, gelling agents, fillers, pigments, dyestuffs, optical brighteners, ultraviolet absorbers and antioxidants.

5. A process according to claim 1 wherein the final admixture is coated on one side only of said textile reinforcing material and the outer surface of the dried sheet structure remote from said textile reinforcing material is abraded to expose the underlying porous body of the polyurethane resin.

6. A process according to claim 1 wherein the final admixture is coated on both sides of said textile reinforcing material and the outer surfaces of the dried sheet structure are abraded to expose the underlying porous body of the polyurethane resin.

* * * * *